United States Patent [19]

Little

[11] Patent Number: 4,470,536

[45] Date of Patent: Sep. 11, 1984

[54] PROJECTION WELDING PROCESS

[75] Inventor: Paul V. Little, Old Field, N.Y.

[73] Assignee: Dover Findings Inc., St. James, N.Y.

[21] Appl. No.: 431,620

[22] Filed: Sep. 30, 1982

[51] Int. Cl.³ .................... B23K 11/14; B23K 31/02
[52] U.S. Cl. .................................... 228/159; 29/4; 219/93; 79/2
[58] Field of Search ............ 29/4; 228/160, 159; 219/93; 79/1, 2; 24/90 HA, 101 R, 101 B, 265 EE; 51/313, 314

[56] References Cited

U.S. PATENT DOCUMENTS

| | | | |
|---|---|---|---|
| 327,873 | 10/1885 | Foote | 79/2 X |
| 747,053 | 12/1903 | Ehrlich | 79/1 |
| 2,016,240 | 10/1935 | Clark et al. | 79/3 |
| 2,105,669 | 1/1938 | Parsons | 79/1 |
| 2,263,166 | 11/1941 | Darvie et al. | 113/12 |
| 2,826,439 | 3/1958 | Sholle et al. | 219/98 |
| 3,052,966 | 9/1962 | Cronan | 29/160.6 |
| 3,287,037 | 11/1966 | Aversten | 403/292 |
| 3,601,574 | 8/1971 | Fiddler | 219/93 |
| 3,701,878 | 10/1972 | Hinden et al. | 219/98 |
| 3,774,009 | 11/1973 | Hodges | 219/98 |
| 3,924,357 | 12/1975 | Schmidt et al. | 51/314 |
| 3,996,446 | 12/1976 | Tauern et al. | 219/99 |
| 4,031,350 | 6/1977 | Hinden et al. | 219/99 |
| 4,132,879 | 1/1979 | Glorioso | 219/98 |
| 4,261,245 | 4/1981 | Mauer | 411/43 |

FOREIGN PATENT DOCUMENTS

| | | | |
|---|---|---|---|
| 1313032 | 11/1962 | France | 24/90 HA |
| 282423 | 12/1964 | Netherlands | 24/90 HA |
| 1782 | 12/1790 | United Kingdom | 79/2 |

Primary Examiner—Nicholas P. Godici
Assistant Examiner—P. Weston Musselman, Jr.
Attorney, Agent, or Firm—Stanley Ira Laughlin

[57] ABSTRACT

Applicant's invention relates to a process and apparatus for the high speed welding in large quantities of various geometric shaped jump rings to buttons, pendants and other jewelry by utilizing composite jump ring apparatus having first and second projections extending from the jump rings at different locations so that they may function in automatic welding machines.

3 Claims, 9 Drawing Figures

PROJECTION WELDING PROCESS

BACKGROUND OF THE INVENTION

The invention relates to welding processes and apparatus generally, and in particularly welding processes and apparatus for use with automatic welding machines such as classified in Classes 29, 79, and 219.

The closest prior art found teaches that welding projections for objects, such as taught in U.S. Pat. No. 3,996,446 to Tauern et al, and the use of fracture means for brazing studs used in brazing terminals to plates, taught in U.S. Pat. No. 2,826,439 to Sholle et al, are well known.

Automatic welding devices, such as taught in U.S. Pat. No. 4,132,879 and U.S. Pat. No. 4,031,050 to Glorioso and Hinden et al, respectively, are also well known. U.S. Pat. No. 3,701,878 to Hinden teaches sheet metal welding pins of the type taught in U.S. Pat. No. 4,031,350.

The methods of making buttons and cuff links, such as taught in U.S. Pat. No. 3,052,966 to Cronan and U.S. Pat. No. 2,016,240 to Clark et al are also well known.

U.S. Pat. No. 3,287,037 to Aversten and U.S. Pat. No. 2,263,166 to Darvie et al teaches the art of soldering, and are not relevant to applicant's welding process and apparatus.

U.S. Pat. No. 4,261,245 to Mauer and U.S. Pat. No. 3,774,009 to Hodges which teaches the fastener art is likewise not relevant to applicant's welding process and apparatus.

SUMMARY OF THE INVENTION

Applicant's invention relates to the process and apparatus for the high speed welding of various shaped securing objects such as jump rings to miniature buttons, pendants and other pieces of jewelry by use of automatic welding machines.

It is an object of applicant's inventive process and apparatus to weld jump rings to said miniature buttons safely and economically.

It is a further object of applicant's inventive process and apparatus to provide simple techniques and means for large scale welding production.

DETAILED DESCRIPTION

The advent of automatic welding machines has greatly aided the jewelry industry in the high speed joining of various objects such as straight pins to spheres, but has not as yet been applied to securing objects such as jump rings that are attached to miniature buttons, pendants or other items of jewelry. In the case of the miniature buttons the jump rings provide for the attachment of the button to material without breaking from the stress the button may have applied to it.

Figure 1:
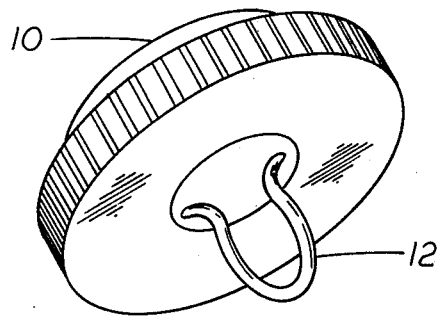
FIG. 1 is an iosmetric view of the prior art showing a miniature button having a conventional jump ring affixed thereto.
Figure 2:
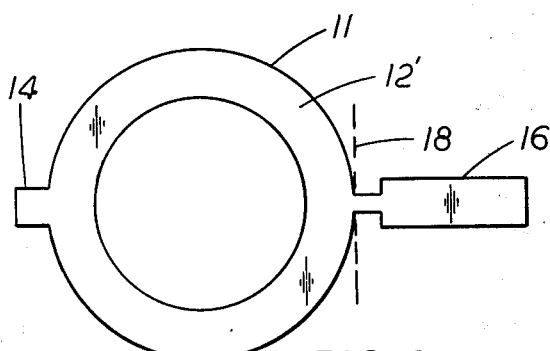
FIG. 2 is a top plan view of one embodiment of applicant's apparatus prior to welding.
Figure 5:
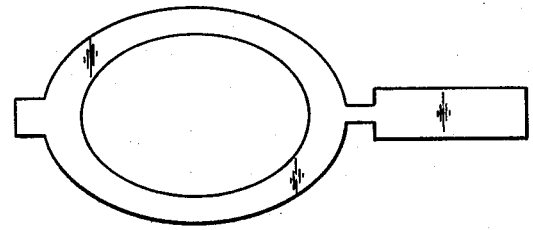
FIG. 5 is a top plan view of another embodiment of applicant's invention.
Figure 3:
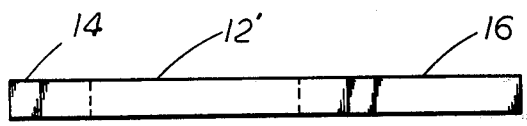
FIG. 3 is a side elevation view of the apparatus shown in FIG. 2.
Figure 6:
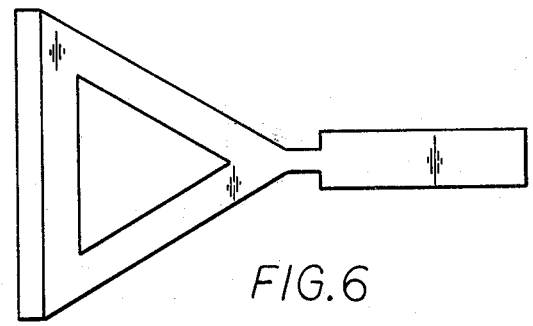
FIG. 6 is a top plan view of yet another embodiment of applicant's inventive apparatus.

FIG. 1 shows the prior art as presently existing in the industry wherein a miniature button 10 has a jump ring 12 secured to it by conventional soldering techniques. In addition to being subjected to manufacturing that is extremely costly, unfortunately solder does not always withstand the stresses and strains placed upon the buttons, as would be more noticeable in the military and sports environments.

Figure 4:
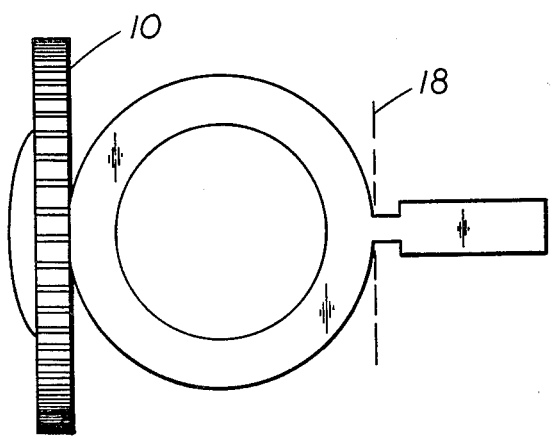
FIG. 4 is a top plan view of the apparatus of FIG. 2 attached to a button after welding.
Figure 7:
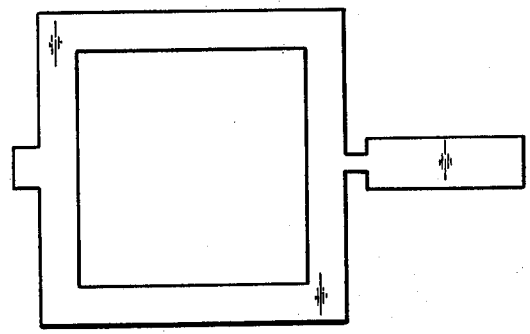
FIG. 7 is a top plan view of still another embodiment of applicant's inventive apparatus.
Figure 8:
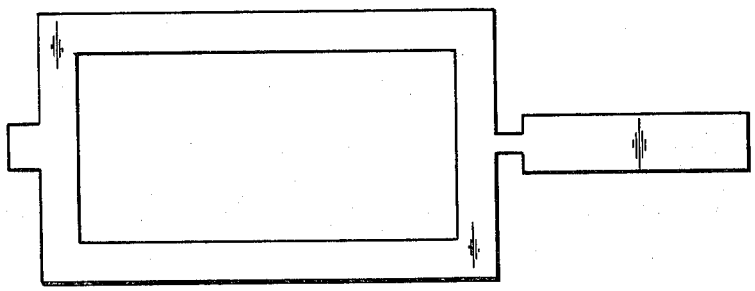
FIG. 8 is a top plan view of yet still another embodiment of applicant's inventive apparatus.

Applicant's invention comprises the process of either stamping out a composite apparatus from metals such as brass, or extruding a composite apparatus into plastics comprising the particular jump ring 11 having a first projection 14, which will subsequently be liquidified by fusion welding into the miniature button 10, and a second projection 16, which will be inserted into the holding collet of an automatic fusion welding machine, such as the Model AP-44 Precussion Welder manufactured by the Hanson Engineering Company, Inc. or the EDF-2000F Fusion/Welding Machine marketed by Electron Fusion Devices, Incorporated. After the apparatus 11 is welded to the miniature button 10, the first projection 14 will have liquidified into the button 10, as indicated in FIG. 4, leaving apparatus 11 securely fastened to the miniature button. The second projection 16 can then be broken away along line 18 while the button 10 and jump ring 12' are tumbled to also round off square edges.

Although a substantially circular shaped jump ring has been illustrated in the foregoing paragraphs, any geometric shaped securing object could be secured by applicant's process to miniature button 10. FIGS. 5 through 8 are illustrative of the alternate embodiments envisioned in this invention.

Figure 9:
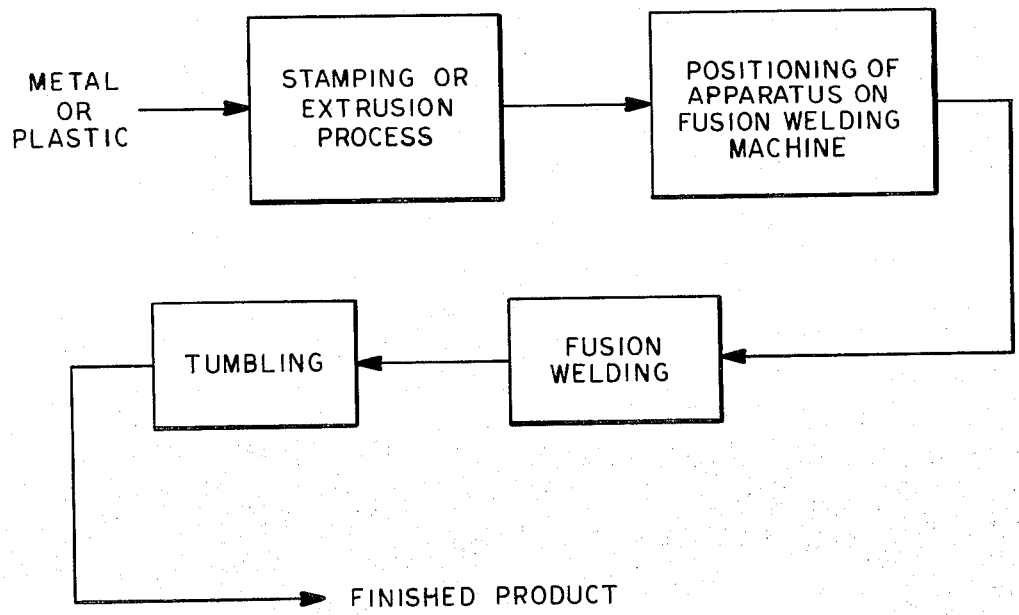
FIG. 9 is a flow diagram of applicant's inventive process.

FIG. 9 is a flow diagram illustrating applicant's inventive process for the high speed welding of intermediate securing objects such as jump rings by means of automatic fusion/welding machines comprising the stamping out of metal apparatus or extruding plastic apparatus, positioning the apparatus in the automatic machine, welding the apparatus to the button or or other jewelry and tumbling the miniature button or other jewelry with the jump ring attached to break the second projection which was used for holding the apparatus in the automatic welding machine away and round off all the square edges.

Even though only a finite number of embodiments have been illustrated, applicant's invention should not be so limited, but should only be limited by the scope and breadth of the annexed claims.

I claim:

1. A process for welding jump rings and the like to buttons, pendants and other jewelry in large quantities at high speeds by means of automatic welding machines comprising fabricating composite apparatus having a jump ring or the like with first and second projections, each of said first and second projections being located at different places on said jump rings or the like, positioning said apparatus in said automatic welding machine by having said machine hold one of said projections while the welding to be performed occurs at the other projection, welding said jump ring or the like to said button, pendant and other jewelry by liquidifying said other projection, and tumbling said button, pendant and other jewelry having said jump ring or the like welded thereto to break away said remaining projection from said jump rings or the like and round off the edges.

2. A process as claimed in claim 1 wherein said fabricating composite apparatus comprises stamping out metals.

3. A process as in claim 1 wherein said fabricating composite apparatus comprises extruding plastics.

* * * * *